United States Patent
Murakami et al.

(10) Patent No.: US 8,546,015 B2
(45) Date of Patent: Oct. 1, 2013

(54) BATTERY CAN AND ALKALINE BATTERY

(75) Inventors: Yukiyoshi Murakami, Shizuoka (JP); Shigeyuki Kuniya, Shizuoka (JP)

(73) Assignee: FDK Energy Co., Ltd., Shizuoka (JP)

( * ) Notice: Subject to any disclaimer, the term of this patent is extended or adjusted under 35 U.S.C. 154(b) by 0 days.

(21) Appl. No.: 13/062,715

(22) PCT Filed: Sep. 18, 2009

(86) PCT No.: PCT/JP2009/066874
§ 371 (c)(1),
(2), (4) Date: Mar. 8, 2011

(87) PCT Pub. No.: WO2010/035857
PCT Pub. Date: Apr. 1, 2010

(65) Prior Publication Data
US 2011/0165455 A1   Jul. 7, 2011

(30) Foreign Application Priority Data
Sep. 25, 2008   (JP) .................................. 2008-246984

(51) Int. Cl.
*H01M 2/02*   (2006.01)
*H01M 6/08*   (2006.01)

(52) U.S. Cl.
USPC ........................... 429/176; 429/164; 429/185

(58) Field of Classification Search
USPC ................................................ 429/176, 185
See application file for complete search history.

(56) References Cited

U.S. PATENT DOCUMENTS
2004/0185337 A1   9/2004   Ishizaki

FOREIGN PATENT DOCUMENTS

| EP | 1 246 274 | | 10/2002 |
| EP | 1 906 468 | | 4/2008 |
| EP | 2 051 313 | | 4/2009 |
| EP | 2051313 A1 | * | 4/2009 |
| JP | 06-2104 | | 1/1994 |
| JP | 2000-011966 | | 1/2000 |
| JP | 2004-119194 | | 4/2004 |
| JP | 2007066762 A | * | 3/2007 |
| JP | 2008-41527 | | 2/2008 |
| JP | 2008041527 A | * | 2/2008 |

* cited by examiner

Primary Examiner — Gregg Cantelmo
(74) Attorney, Agent, or Firm — Clark & Brody

(57) ABSTRACT

This invention provides a battery can allowing for a reduced amount of gas forming therein, thus realizing lower production cost. The cathode can 11 of an alkaline battery is cylindrically shaped and closed-bottomed, comprising an opening 15, a body 17 and a bottom 18, with the body 17 being divided into an opening sealing section 31 and an electrode mixture container section 33 which are arranged in order from the opening 15, with the plate thickness t0 set for the electrode mixture container section 33, which is not less than 80% of the plate thickness t1 of the opening sealing section 31, with the plate thickness t3 of the electrode mixture container section 33 gradually reducing in the region starting at the topmost point of the electrode mixture container section 33 and ending at the set plate thickness t0.

1 Claim, 5 Drawing Sheets

BATTERY CAN AND ALKALINE BATTERY

ART BACKGROUND

This invention relates to a cylindrical battery can of a closed bottom, comprising an opening, a body, a bottom and an alkaline battery of the same battery can.

TECHNICAL BACKGROUND

In general, an alkaline battery comprises a cylindrical cathode can of a closed bottom, a cathode ring-shaped mixture stored in the cathode can, an anode gel mixture stored centrally in the cathode can, a cylindrical separator of a closed bottom set between the cathode mixture and anode gel mixture, and a current collector upon the opening constituting a negative terminal, a sealing plate and a sealing gasket. In the cathode can, there is an air chamber between the sealing gasket and the anode mixture.

The cathode can of the alkaline battery is made by pressing nickel-plated sheet steel cylindrically with a closed bottom. The cathode mixture is made mostly of granulated manganese dioxide and nickel oxyhydroxide powder that is pressed into the cylindrical tube, thus storing it within the cathode can.

Since the cathode can is made by pressing, the iron beneath the nickel surface of the can may be exposed, thus affecting the resistance of the iron to corrosion. Thus, as described in Patent Document 1, the rate of iron surface exposure before pressing the nickel-plated sheet steel is defined.

As for alkaline batteries recently used, the opening of the cathode can is made thicker than the body, with the opening and current collector thereof being sealed by curling and squeezing. The thicker opening assures sufficient strength for sealing the can, whilst a thinner body allows for a bigger battery capacity, thus improving battery performance.

Even though the rate of iron surface exposure before pressing the nickel-plated sheet steel is defined, as described in Patent Document 1, such a rate of exposure varies after making the battery can by pressing or molding or the like. In pressing nickel-plated sheet steel to make a battery can of different thicknesses, the thickness of the sheet steel must be varied by multi-step pressing, for any section of different thickness may cause stripping of the nickel plating, thus exposing the iron base.

The exposed iron (i.e. ferrum) on the surface of the cathode can of the alkaline battery is soused in a strong alkaline electrolyte solution (passivation), so it is unlikely that the iron will corrode. However, as shown in FIG. 7, the nickel (Ni) of the nickel plating of the surface of the battery can 51a is nobler than the iron (Fe) beneath the surface. Thus, with iron (Fe) being an oxidant, i.e. a metallic oxide of manganese dioxide ($MnO_2$), and since it is with the nickel oxyhydroxide of the cathode mixture and with oxygen ($O_2$) of the air chamber within the cathode can 51, any exposed iron (Fe) of the cathode can 51 dissolves to become iron ($Fe^{2+}$) that will react with the zinc (Zn) in the anode mixture 53 to form hydrogen gas that will increase the pressure within the battery 50, thus causing liquid leakage.

To solve this problem, an alkaline battery should be made in which a nonmetallic film is provided on the inner surface of the cathode can from the opening to the place contacting the cathode mixture (see Patent Document 2). Such a nonmetallic film would prevent the iron from corroding, thus preventing gas forming in the battery.

Patent Document 1: Japanese Published Utility Model Application No. H06-2104.

Patent Document 2: Japanese Published Unexamined Patent Application No. 2004-119194.

DISCLOSURE OF INVENTION

Problems to be Resolved by the Invention

As described in Patent Document 2, however, to apply a nonmetallic film on the inner surface of the cathode can, it would be necessary to develop new equipment and a coating method to apply such a film. This would increase the number of components, thus increasing the cost of manufacturing the alkaline battery.

This invention was achieved in light of the aforementioned problems to provide at a low cost a battery can that reduces the amount of gas formed within. Also, in using such an improved battery can, liquid leakage is reduced, thus providing an alkaline battery with long-term reliability.

Means of Solving the Problems

To solve the aforementioned problems, the first aspect of this invention refers to a closed-bottomed cylindrical battery can comprising a body, a bottom and an opening, with the body being made of pressed nickel-plated sheet steel and divided into an opening sealing section and an electrode mixture container section arranged nearer the bottom of the can, with the thickness of the opening sealing section being greater than that of the electrode mixture container section which contains the electrode mixture, of which the main ingredient is manganese dioxide or nickel oxyhydroxide, with the plate thickness of the electrode mixture container section being less than 80% of the plate thickness of the opening sealing section, with the plate thickness of the electrode mixture container section being gradually reduced in the region starting at the topmost point of the electrode mixture container section and ending at the set plate thickness.

According to the first aspect of this invention, the plate thickness of the electrode mixture container section is less than 80% of the plate thickness of the opening sealing section to allow the battery to hold a sufficient amount of electrode mixture. With regard to the conventional battery can, the plate thickness of the electrode mixture container section exceeds 80% of the plate thickness of the opening sealing section. Thus, the battery can of this invention holds more electrode mixture than that of a conventional battery can. Also, as described above, the plate thickness of the electrode mixture container section gradually reduces to let the pressing process, including drawing and squeezing, be done moderately to reduce the rate of iron exposure so that the amount of gas forming in the battery can is reduced, thus reducing liquid leakage. Thus, the battery can of this invention realizes a reduction of gas forming within without the need of a nonmetallic film, as is needed in the conventional art, thus reducing manufacturing cost.

The second aspect of this invention is that the ending point of the region is set at the topmost point of the electrode mixture container, in the mode of the first invention.

The second aspect of this invention is that the electrode mixture is pressed into the electrode mixture container section of the battery can.

The third aspect of this invention of the first or second embodiment is that the plate thickness of the electrode mixture container section varies in rate between 5% and 15% per millimeter.

The third aspect of this invention is that the plate thickness of the electrode mixture container section moderately varies when being pressed, to reduce the rate of iron exposure.

The fourth aspect of this invention refers to an alkaline battery comprising either of the battery cans as described in the first, second and third aspects of this invention.

The fourth aspect of this invention curbs production cost, contrary to the conventional alkaline battery which requires a nonmetallic film to be applied on the internal surface of the battery can.

Effectiveness of the Invention

As described above, the first and/or third aspect(s) of this invention has the inventive battery can realizing a reduced amount of gas forming within, without the higher cost of having to increase the number of components. The fourth aspect of this invention realizes a decrease in liquid leakage, thus providing a long-term reliable alkaline battery.

PREFERRED EMBODIMENTS

Hereinafter, the preferred embodiments of this invention is described in reference to the figures. FIG. 1 is a cross-sectional view of the structure of the alkaline battery 10 of the embodiment of this invention, designated as LR03-P4 AAA.

As shown in FIG. 1, the alkaline battery 10 comprises a cylindrically closed-bottomed cathode can 11 (i.e. the battery can) with a cathode ring-shaped mixture 12 (i.e. the electrode mixture) fitted within the cathode section of the can 11, with closed-bottomed separator 13s set on the inner side of the cathode mixture 12, with an anode gel mixture 14 centrally stored within both separator 13s, and with a current collector 16 attached to the opening 15 of the cathode can 11.

The cathode can 11 is made of pressed nickel-plated sheet steel forming a closed-bottomed cylinder of an opening 15, a body 17 and a protruding cathode terminal 19 located centrally at the bottom 18.

The cathode mixture 12 is a granulated powder of electrolytic manganese dioxide, graphite, potassium hydrate and a binder pressed into the cylindrical-shaped cathode can 11.

The cylindrical separator 13 is made of battery separator paper of a vinylon-rayon blend of non-woven fabric, polyolefin or the like, with the overlapping parts being heat sealed.

The anode gel mixture 14 is made of dissolved zinc oxide and potassium hydrate in water, and of a gelator such as polyacrylic acid or the like, and of zinc powder.

The current collector 16 comprises an anode terminal 21, a negative electron collector 22 and a sealing gasket 23. A bead 24 for fitting the current collector 16 is at the opening 15 of the cathode can 11. The current collector 16 is fitted onto the bead 24, and the opening 15 of the cathode can 11 is curled and squeezed to seal the cathode can 11.

The current collector 16 and bar-shaped negative electron collector 22 is made of brass. The anode terminal 21 is resistance-welded onto the base end of the negative electron collector 22, with the sealing gasket 23 being fitted to the neck of the negative electron collector 22. The fore end of the negative electron collector 22 protrudes into the anode gel mixture 14.

The anode terminal 21 is made of pressed nickel-plated sheet steel, as is the cathode can 11, and is sealed at the opening 15 of the cathode can 11 by the sealing gasket 23 made of injected molding resin materials such as polyolefin resin, polyamide resin or the like. An air chamber 25 is formed between the inner surface of the sealing gasket 23 and the top surface of the anode gel mixture 14.

A boss 26 is centrally fitted to the sealing gasket 23, with the negative electron collector 22 protruding through the boss 26. A thin wall 27 (i.e. a safety valve) of the sealing gasket 23 exists at both sides of the boss 26. Whenever forming gas increases pressure within the can 11, the thin wall 27 of the sealing gasket 23 will break to release the gas.

Hereinafter, the structure of the cathode can 11 of the alkaline battery 10 of the embodiment of this invention is described.

As shown in FIG. 2, the body 17 of the cylindrically closed-bottom cathode can 11 is divided into an opening sealing section 31, a different thickness section 32, and a cathode mixture container section 33 of a smaller diameter than that of the opening sealing section 31. To insure sufficient strength to seal the opening, the opening sealing section 31 is thicker than the cathode mixture container section 33. The plate thickness at t1 of the opening sealing section 31 gradually reduces to the bottom 18 of the battery can. Thus, the plate thickness at t2 starting at the end of the opening 15 of the different thickness section 32 is 0.25 mm, with the bottom 18 being 0.2 mm. The different thickness section 32 is such that the cathode mixture 12 is easily inserted into the cathode can 11. In the preferred embodiment of this invention, the length L1 of the opening sealing section 31 is 4.0 mm, and the length L2 of the different thickness section 32 is 0.7 mm.

Regarding the body 17 of the cathode can 11, the plate thickness at t0 of the cathode mixture container section 33 is 80% less than the plate thickness at t1 of the opening sealing section 31. The plate thickness at t3 of the electrode mixture container section 33 is reduced in the region R1 starting at the topmost point of the cathode mixture container section 33 and ending at the set plate thickness of t0. In the cathode mixture container section 33 of the embodiment of this invention, the region R1 is 3 mm downward from the topmost point of tapering. The plate thickness at t3, the start of the region R1, is 0.2 mm. The plate thickness at t3 at the end (the set plate thickness t0) of the region R1, is 0.16 mm. The end of the region R1, where the plate thickness at t3 gradually reduces, is set at the top surface level of the cathode mixture 12.

The inventors of this invention made the alkaline battery 10 as shown in FIG. 1 by using the cathode can 11 comprising the above mentioned structure. They measured the amount of gas that forms in the battery. The result is shown in FIG. 3. The inventors made an alkaline battery using a conventional cathode can 41 (as shown in FIG. 4) without the gradually reduced region R1 in the cathode mixture container section 33 of the body 17. The amount of gas that formed in the battery is shown comparatively in FIG. 3. Of the cathode can 41, as shown in FIG. 4, the plate thickness at t1 of the opening sealing section 31 of the body 17 is 0.25 mm, the same as that of the preferred embodiment of this invention. The plate thickness at t2 at the end of the different thickness section 32 is 0.16 mm, or the same as the set plate thickness at t0 of the cathode mixture container section 33.

In a specific way, the alkaline battery 10 of the embodiment of this invention and the comparative example were placed in water of 90 degrees C. The difference in the amount of gas formed in each battery was periodically measured. FIG. 3 shows the exponent value of those measurements based on the definition that the amount of gas comparatively formed is that of the exponent value 1.

As shown in FIG. 3, on the fifth day after the start of the test in comparing the inventive alkaline battery 10 with the conventional one, the amount of gas that had formed in the inventive battery was 10% less than that formed in the conventional one. On and after the tenth day after the start of the test, 50% less gas had formed in the inventive battery than in the conventional one.

Also, the inventors of this invention placed 35 units each of the alkaline battery 10 of the embodiment and of the comparative example in water of 90 degrees C. to test for liquid leakage. As shown in FIG. 5, the comparative alkaline batteries leaked after the 20th day of the test, and the amount of leakage had increased day by day. However, the inventive alkaline batteries 10 did not leak, even after 35 days from the start of the test.

Therefore, the embodiments of this invention provide the following effects.

(1) In the cathode can 11 of this invention, the plate thickness at t0 of the cathode mixture container section 33 is less than 80% of the plate thickness at t1 of the opening sealing section 31, to realize an efficient-volume battery. Also, in the region R1, the plate thickness at t3 of the cathode mixture container section 33 gradually reduces, so that the squeezing/drawing process of pressing the cathode can 11 can be done moderately to reduce the rate of exposure of the iron surface. As a result, the amount of gas that forms in the alkaline battery 10 is reduced. Thus, liquid leakage is reduced. This results in a long-term reliable alkaline battery 10. Also, the production cost of this invention is less than that of the conventional alkaline battery which has a non-metallic film. In other words, the cathode can 11 can be produced at a lower cost simply by partially altering the shape of the mold.

(2) Of the alkaline battery 10 of this embodiment, the end of the region R1, where the plate thickness at t3 of the cathode mixture container section 33 gradually reduces, is set at the topmost point of the cathode mixture 12 within the cathode can 11 (See FIG. 1). As such, the cathode mixture 12 is pressed into the cathode mixture container section 33, thus surely storing it within the cathode can 11.

(3) In the region R1 (3 mm in length) of the inventive cathode can 11, the plate thickness of 0.2 mm at t3 gradually reduces by 20% to 0.16 mm (a reduction of 6.7% per mm). As such, the plate thickness at t3 of the cathode mixture container section 33 gradually reduces to prevent the nickel plating from cracking or the like during pressing, thus reducing the rate of exposure of the iron surface.

The embodiment of this invention can also be altered, as described below.

The aforementioned alkaline battery 10 entails the cathode can 11 and the different thickness section 32 formed on the body 17. However, as shown in FIG. 6, the alkaline battery 10 also entails the cathode can 43, of which the different thickness section 32 is not formed. The cathode can 43, as shown in FIG. 6, also has the body 17 and the bottom 18 (not shown in FIG. 6) and is cylindrical and closed-bottomed with an opening, with the body 17 constituting both the opening sealing section 31 and the cathode mixture container section 33 which includes the bottom 18. Also, the plate thickness of 0.16 mm at t0 of the cathode mixture container section 33 of the cathode can 43 is not more than 80% of the plate thickness (0.25 mm) at t1 of the opening sealing section 31. In the region R1, starting at the topmost point of the cathode mixture container section 33 and ending at the plate thickness of t0, the plate thickness at t3 of the cathode mixture container section 33 gradually reduces, so that the cathode can 43 realizes only moderately the squeezing/drawing process of the pressing of the cathode can 11, thus reducing the exposure rate of the iron surface. Thus, the amount of gas that forms in the alkaline battery 10 is reduced, thus finally reducing liquid leakage.

Regarding the above embodiments, the main ingredient of the cathode mixture 12 is manganese dioxide. Alternatively, nickel oxyhydroxide or a mixture containing both manganese dioxide and nickel oxyhydroxide is used. Regarding the plate thickness of 0.2 mm at t3 of the above embodiments, the cathode mixture container section 33 gradually reduces by 20% to 0.16 mm in the region R1 of 3 mm in length. Accordingly, it is possible to change the gradual reduction ratio of the length L1 of the region R1 and to change the plate thickness at t3. However, it is preferable to change the plate thickness at t3 of the cathode mixture container section 33 from a ratio of 5% to that of 15% per mm.

In the above embodiments, the cathode can 11 is made of nickel-plated sheet steel, or of a particular sheet steel that is thermally processed, to form an Fe—Ni diffusion layer on the interface between the iron base and the nickel plating.

The aforementioned embodiments of this invention entail the cathode can 11 of the alkaline battery 10; entail the cylindrical-shaped battery can and alkaline battery; and entail the AAA (cell) battery or a AA (cell) battery, or a battery of a different size.

In addition to the technical idea, as described in the Claims, below, the technical ideas figured in the aforementioned embodiments are hereby described.

(1) A battery can of either Means 1, Means 2 or Means 3, whereby the cathode can is used as the alkaline battery.

(2) A cylindrically closed-bottomed battery can comprising an opening, a body and a bottom, made of pressed nickel-plated sheet steel, consisting of an opening sealing section, a different thickness section and a cathode mixture container section of smaller diameter than that of the opening sealing section, and all arranged in order from the opening side, with the plate thickness of the opening sealing section being greater than that of the electrode mixture container section that can hold either an electrode mixture mainly consisting of manganese dioxide or nickel oxyhydroxide, with the plate thickness of the electrode mixture container section being 80% less than that of the opening sealing section, and with the plate thickness of the cathode mixture container section being gradually reduced in the region starting from the topmost point of the electrode mixture container section and ending at the set plate thickness.

EXPLANATION OF REFERENCE NUMERALS

Figure 1:
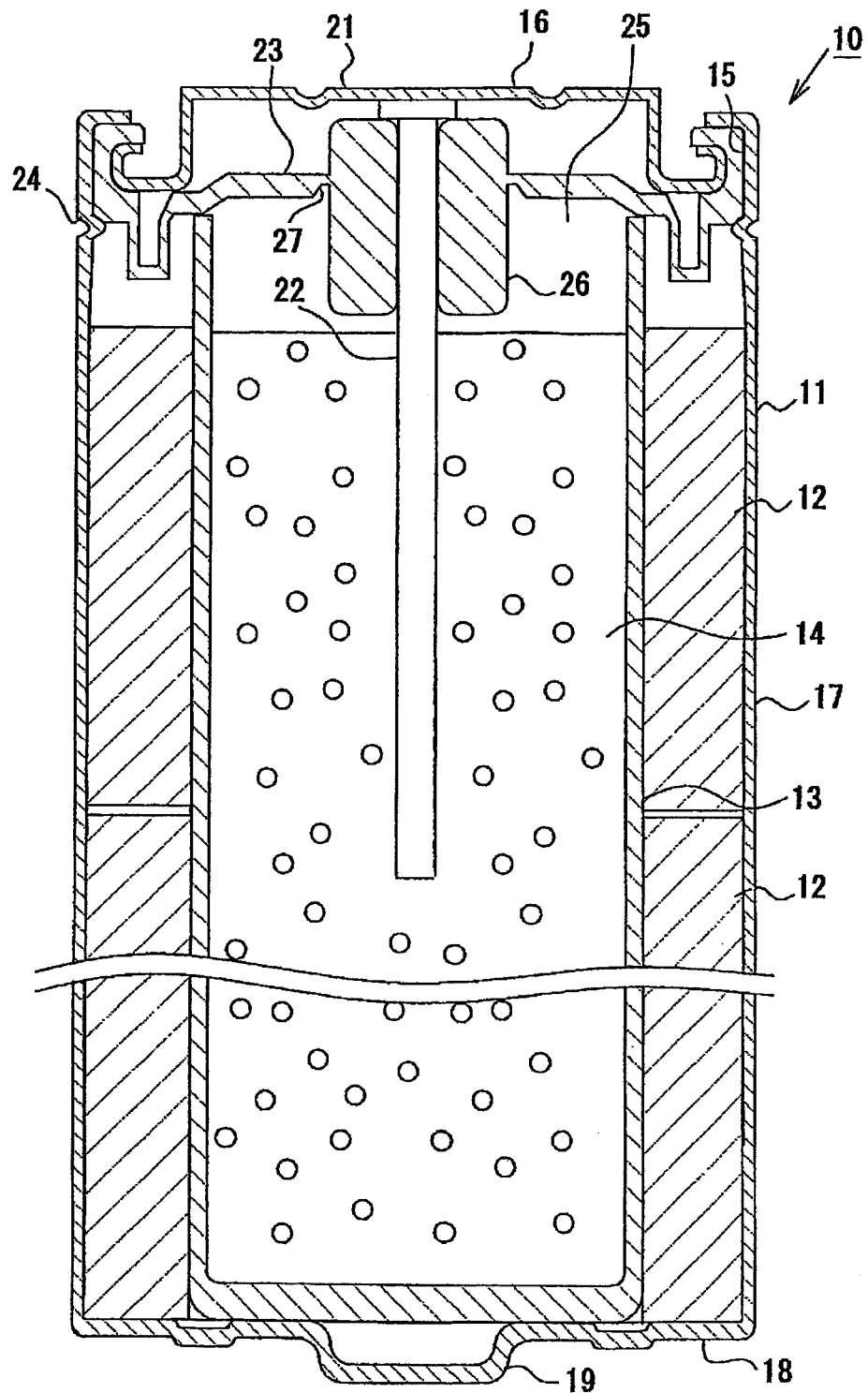
FIG. 1 is a cross-sectional view of the embodiment alkaline battery of this invention.
Figure 2:
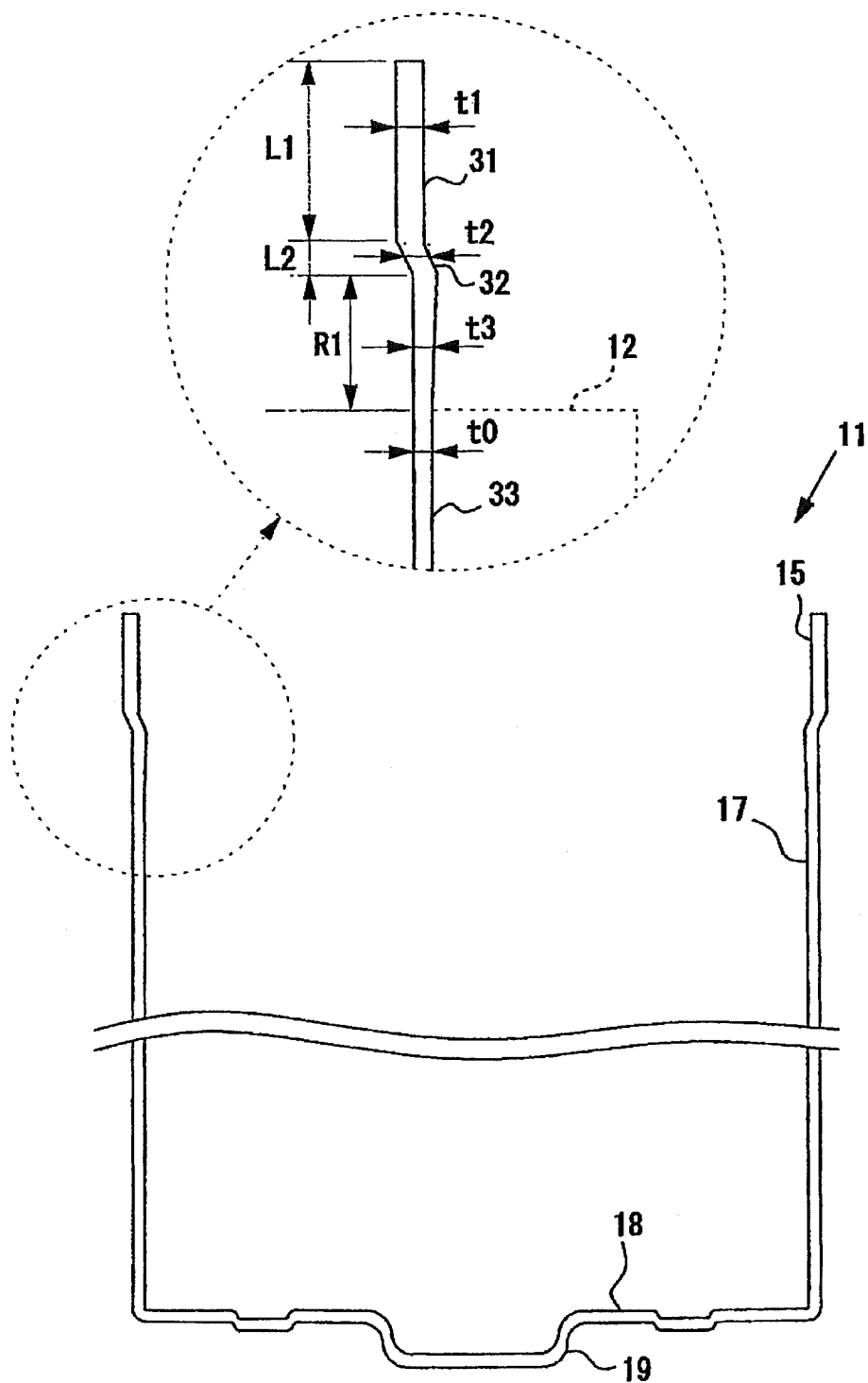
FIG. 2 is a cross-sectional view of the cathode can.
Figure 3:
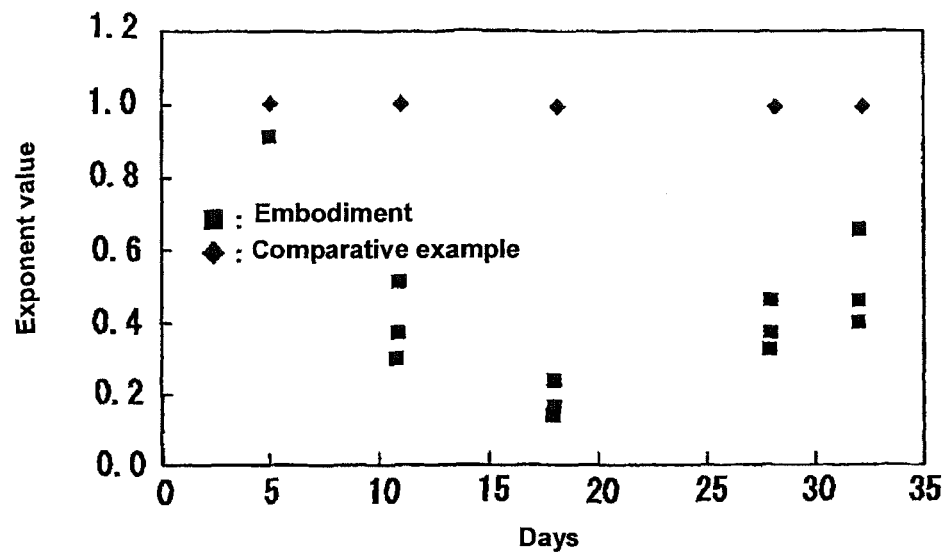
FIG. 3 graphically shows the amount of gas being formed in the battery.
Figure 4:
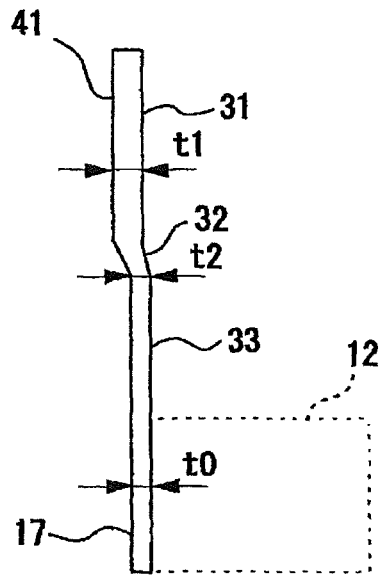
FIG. 4 is an enlarged cross-sectional view showing the comparative cathode can.
Figure 5:
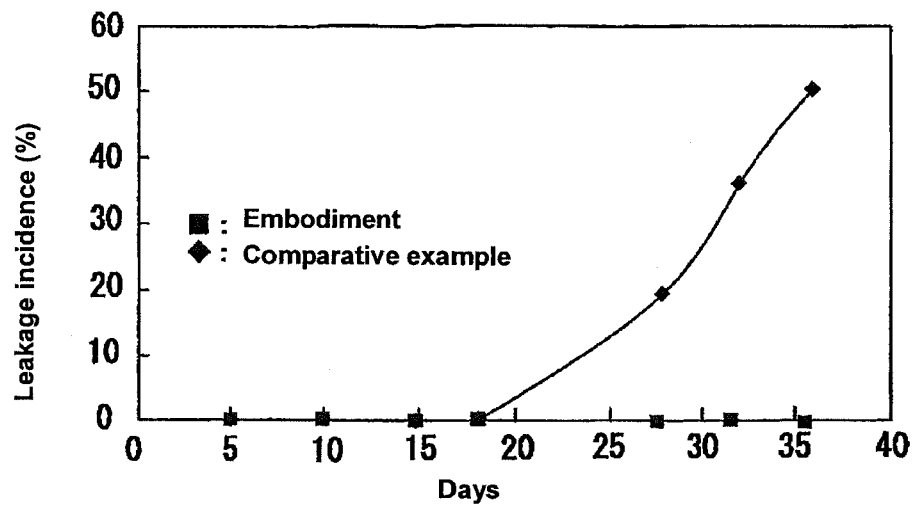
FIG. 5 graphically shows the result of the test of the battery for liquid leakage.
Figure 6:
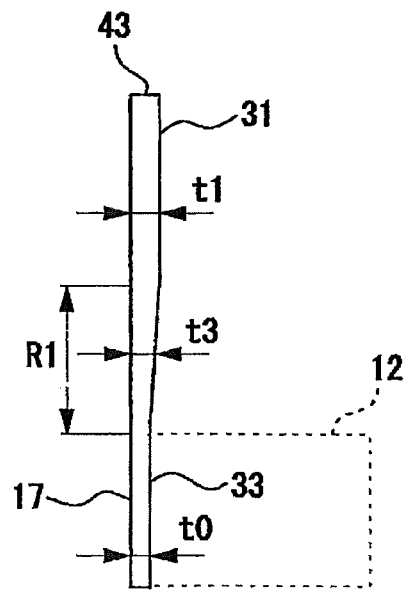
FIG. 6 is an enlarged cross-sectional view of another cathode can embodiment.
Figure 7:
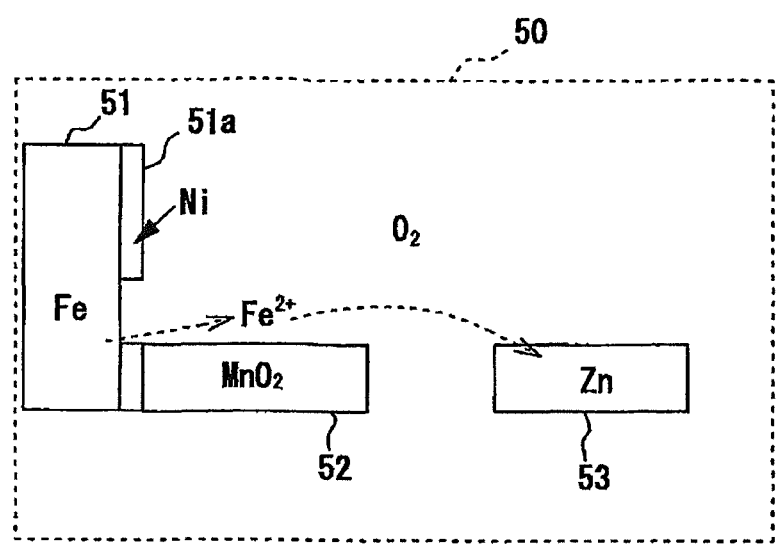
FIG. 7 explains the conventional alkaline battery.

10: alkaline battery
11, 43: cathode can as a battery
12: cathode mixture
15: opening
17: body
18: bottom
31: opening sealing section 32: different thickness section
33: cathode mixture container section
R1: region
t0: plate thickness at the electrode mixture container section
t1: plate thickness at the opening sealing section
t2: plate thickness at the different thickness section
t3: plate thickness at the electrode mixture container section

What is claimed is:

1. A closed-bottomed cylindrical alkaline battery comprising a body, a bottom and an opening, with the body being made of pressed nickel-plated sheet steel and divided into an opening sealing section and an electrode mixture container section arranged nearer the bottom of the can, the electrode mixture container section containing the electrode mixture of which the main ingredient is either manganese dioxide or nickel oxyhydroxide, with the thickness of the opening sealing section being greater than a set plate thickness of the electrode mixture container section, with the set plate thickness of the electrode mixture container section being less than 80% of the plate thickness of the opening sealing section, and the plate thickness of the electrode mixture container section tapering in a region starting from the topmost point of the electrode mixture container section and ending at the set plate thickness, and wherein an ending point of the region is set at the topmost point of the electrode mixture.

* * * * *